Feb. 16, 1937.    F. W. TRABOLD    2,070,850
MEAT PRODUCT
Filed Nov. 15, 1935

INVENTOR
Frank W. Trabold,
BY
ATTORNEYS

Patented Feb. 16, 1937

2,070,850

UNITED STATES PATENT OFFICE 2,070,850

MEAT PRODUCT

Frank W. Trabold, Detroit, Mich.

Application November 15, 1935, Serial No. 49,956

6 Claims. (Cl. 53—5)

This invention relates to the type of meat products known as Frankfurters, and has for its object to provide an improved product together with a new method of making the same.

It is customary to retail Frankfurters in an elongated roll and since the Frankfurters are round in cross section they make rather a clumsy sandwich. It is an object of this invention to provide a Frankfurter of flattened shape in order that it may better fit the familiar type rolls thereby providing a neater and more palatable sandwich product.

A further object is to provide a flattened surface of the Frankfurter on which mustard or other condiments or relishes may be more conveniently and distributively spread.

A further object is to provide a thinner sandwich filler so that same may be heated thoroughly more quickly for final cooking and final dispensing.

In the manufacture of Frankfurters it is customary practice to grind and mix the raw products and then to insert into a casing of some suitable material. The casing is then twisted at intervals of a few inches and then this product is subjected to smoking and steaming for cooking. During the cooking the filler becomes a unified and solidified mass and is naturally round. It is an object of this invention to teach the formation of the product into flattened shape and the method of cooking it whereby it will retain its flattened condition.

A further object is to provide an apparatus suitable for forming while solidifying the product in a continuous operation either during smoking or steaming.

While the invention is particularly adaptable for Frankfurter manufacture it may be applied to sausages generally and to other meat products suitable for use as sandwich material.

Other objects and advantages will become hereinafter more fully apparent as reference is had to the accompanying drawing wherein my invention is illustrated by way of example and in which—

Figure 1:
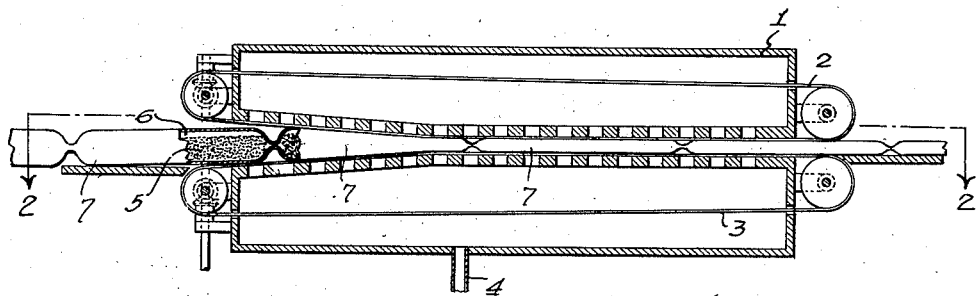
Figure 1 is a longitudinal vertical section through my improved oven.
Figure 2:
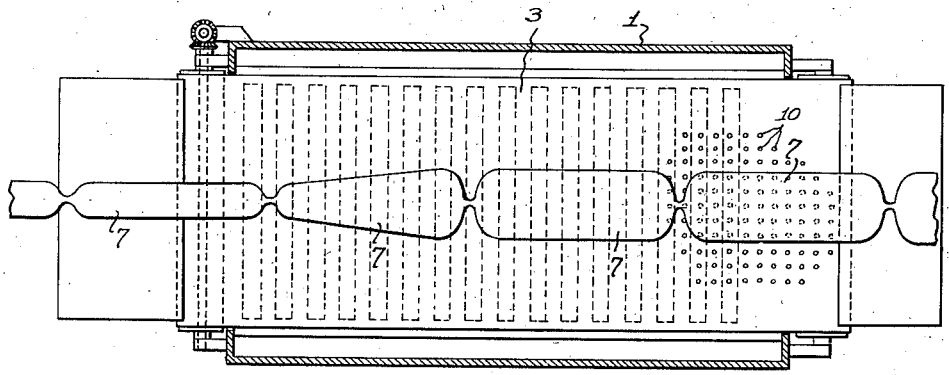
Fig. 2 is a horizontal section taken along the line 2—2 of Fig. 1.
Figure 3:
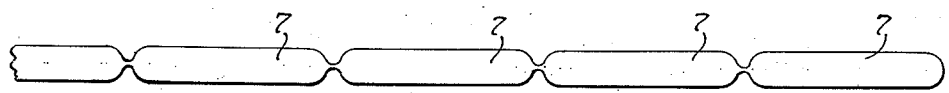
Fig. 3 is a plan view of a prepared product ready for the oven.

I indicates an oven having two conveyors 2 and 3 positioned in such manner that the lower flight of the conveyor 2 is in close proximity to the upper flight of the conveyor 3. The left side of the oven as illustrated is the front or feed side and the distance between the two flights is preferably greater towards the front end and is gradually reduced as the center is approached, the distance thereafter remaining substantially constant. The conveyor flights may be composed of bands or connected plates of any suitable material, freely perforated at 10 as indicated. Some manufacturers prefer to solidify the products during smoking while others solidify during steaming. The oven 1 may be either a smoking or a steaming apparatus, depending on which practice is followed. If the solidifying is accomplished during smoking the forming of the product into flattened shape should be done during smoking and in this case the pipe 4 will be used to admit smoke. If solidifying is accomplished by steaming, the conveyors will travel much faster than for smoking and the pipe 4 will be used to admit steam. It will be understood that the apparatus as illustrated is highly diagrammatic and serves only to illustrate a pressure or weight means for flattening Frankfurters during the solidification.

The prepared product is composed of ground meat products 5 which are stuffed into a casing 6 which is then twisted at intervals to form individual links 7. The products 5 are of less volume than is customary in order to allow for flattening. The reduction in volume is diagrammatically illustrated in Fig. 1 where the casing 6 is partially broken away and indicated as being unfilled. A series of links is then fed into the front end of the oven 1 where it travels with the conveyor belts being gradually flattened during subjection to the atmosphere of steam. After the cooking has been completed with the application of conveyor pressure the product will then retain its flattened condition.

While it is possible to employ a device such as the oven 1 only for flattening purposes and then cook the product later, and conversely while it is possible to cook the product first and then form it into the final oval shape I recommend the simultaneous cooking and forming as otherwise the flattened shape will not be properly maintained.

Figure 4:
Fig. 4 is a plan view of the finished product.
Figure 5:
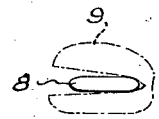
Fig. 5 is an end view of the finished product.

In Figs. 4 and 5 a link 8 in final form is shown inserted in a conventional split roll 9. This final form is oval in longitudinal and transverse cross section with two opposite surfaces substantially flattened.

The teachings herein are applicable to sausages generally and to other formed meat products of the type generally used for sandwiches.

What I claim is:—

1. An apparatus for cooking Frankfurters comprising an oven, a conveyor in said oven, a second conveyor above the first named conveyor with the lower flight in slightly spaced relation with the upper flight of the first conveyor whereby a Frankfurter travelling on said first conveyor is subjected to pressure by said upper conveyor.

2. An apparatus for cooking Frankfurters comprising an oven, and two conveyors in said oven with the upper flight of one in slightly spaced relation with the lower flight of the other whereby a Frankfurter travelling therebetween is subjected to pressure causing it to become flattened, the space between said flights being greater at the front end of the oven than towards the rear whereby the flattening occurs gradually during cooking of said Frankfurter.

3. In a device for making Frankfurters and similar food products which device comprises a cooking chamber, and means for conveying Frankfurters through said chamber and subjecting said Frankfurters to pressure during their travel through said chamber.

4. An apparatus for treating uncooked Frankfurters and the like, which apparatus includes a heating chamber, and means for progressively moving Frankfurters through said chamber and subjecting the same to a flattening action during such travel.

5. An apparatus for treating uncooked Frankfurters in link form, which apparatus comprises a chamber, a conveyor in said chamber, and means in opposed relation to said conveyor to subject succeeding links to flattening pressure as they are conveyed through said chamber by said conveyor.

6. An apparatus for treating Frankfurters and the like, which apparatus includes a closed chamber and means for conveying Frankfurters through said chamber, said conveying means comprising conveyors in opposed and spaced apart relation with said spaces varied to squeeze the Frankfurters therebetween and flatten the same during their travel and while being treated in said chamber.

FRANK W. TRABOLD.